United States Patent [19]

Hawkes et al.

[11] 4,240,538
[45] Dec. 23, 1980

[54] METHOD AND APPARATUS FOR ACCUMULATING AND GATING ARTICLES

[75] Inventors: Richard B. Hawkes, Easton; John N. Hobbs, Freemansburg; Terry J. Schuerman, Allentown, all of Pa.

[73] Assignee: Harris Corporation, Cleveland, Ohio

[21] Appl. No.: 864,235

[22] Filed: Dec. 27, 1977

[51] Int. Cl.³ .................... B65G 43/08; B65G 47/46; B65G 13/06

[52] U.S. Cl. .................... 198/358; 198/437; 198/447; 198/451; 198/460; 198/466; 198/470; 198/492; 198/572; 198/575; 198/781

[58] Field of Search .................... 198/356–358, 198/365, 437, 439, 440, 447, 451, 460, 461, 466, 469, 470, 491, 492, 502, 572, 575, 577, 781, 855–857

[56] References Cited

U.S. PATENT DOCUMENTS

| 1,855,767 | 4/1932 | Neuman | 198/460 |
|---|---|---|---|
| 2,470,922 | 5/1949 | Dunn | 198/357 |
| 2,602,536 | 7/1952 | Eggleston | 198/781 |
| 3,122,231 | 2/1964 | Pence et al. | 198/358 |
| 3,187,878 | 6/1965 | Harrison et al. | 198/469 |
| 3,348,655 | 10/1967 | Pierce et al. | 198/461 |
| 3,627,106 | 12/1971 | Winfield | 198/491 |
| 3,749,225 | 7/1973 | Kennedy | 198/437 |
| 3,768,630 | 10/1973 | Inwood et al. | 198/781 |
| 3,871,511 | 3/1975 | Wentz et al. | 198/470 |
| 3,952,859 | 4/1976 | Holt et al. | 198/577 |

Primary Examiner—Joseph E. Valenza

[57] ABSTRACT

Method and apparatus for the controlled accumulating and feeding of piles of magazines from an input conveyor to a trimmer infeed conveyor. A flow director receives magazine piles and directs them to one of three parallel conveyor lanes, each lane including a series of independently driven conveyor sections. The leading pile in each lane is fed by a gate to the trimmer infeed conveyor while a restrictor restrains the succeeding piles from advancing. The procedure is repeated for each succeeding pile on each lane. Each section of each conveyor lane is provided with detectors for detecting stalled magazine piles. When stalled piles are detected at the downstream end of a conveyor section the adjacent downstream conveyor section is shut down. The traffic on the three lanes is compared and the flow director is instructed to not feed piles to a lane having an excessive backup of piles as compared to its neighbors.

3 Claims, 13 Drawing Figures

METHOD AND APPARATUS FOR ACCUMULATING AND GATING ARTICLES

BACKGROUND OF THE INVENTION

This invention relates to the handling of articles such as magazines, periodicals, or the like and more particularly to apparatus and method for receiving piles of magazines from an input line such as a conveyor and feeding them in a controlled manner to an output line such as a trimmer infeed conveyor.

In the art of making magazines and the like, the individual magazines are formed by assembling signatures and conveying them to a binder for binding into magazines. The magazines are then stacked into piles and the piles are conveyed to a trimmer for further operations thereon. The trimmer is normally capable of operation at a higher rate than the upstream equipment so that flow to the trimmer is continuous. Occasionally, however, the trimmer will malfunction. Such malfunctions may require only a very short time to remedy, but, magazine piles will accumulate on the trimmer infeed very quickly. One method for handling such an accumulation is to shut down the upstream equipment until the trimmer malfunction is corrected and clear the accumulation manually.

SUMMARY OF THE INVENTION

An object of this invention is to provide a method and apparatus for the controlled accumulating and feeding of articles such as magazine piles from an input line, such as a delivery conveyor from a binder, to an output line, such as a trimmer infeed conveyor.

According to the present invention, articles such as magazine piles are directed into a number of parallel columns between the delivery conveyor and the trimmer infeed conveyor. The leading pile of each column is separated from the column and fed to the trimmer infeed conveyor in a controlled manner. The columns have a large capacity so that a large number of piles can be accumulated in case of a trimmer malfunction before having to shut down the upstream equipment. After a malfunction is corrected the accumulation is cleared automatically and normal operation is resumed.

Apparatus embodying the present invention includes conveyor means for receiving articles from an input line and conveying the articles downstream toward an output line and means for driving the conveyor means. A gate is provided at the downstream end of the conveyor means for receiving the articles and gating them onto the output line.

According to one aspect of the invention, article restrictor means is provided between the conveyor means and the gate, and means are provided for sensing the presence of articles at the entrance to the gate and at the restrictor means. Means is provided for producing a control signal in response to the presence of articles at both the gate and the restrictor means. Means responsive to the control signal initiates the gating of an article to the output line and causes the restrictor means to prevent the passage of succeeding articles to the gate during the gating operation.

According to another aspect of the invention, the conveyor means comprises a series of conveyor sections and means for driving each conveyor section independently of the remaining sections. Means are associated with each of the conveyor sections for sensing a predetermined accumulation of articles on the adjacent downstream section. Control means responsive to the sensing means is provided for interrupting the driving of the downstream adjacent conveyor section.

According to still another aspect of the invention, a flow director is provided for receiving articles from the input line and directing the articles into a plurality of generally parallel streams. A plurality of conveyor means is provided for receiving and conveying the articles in the generally parallel streams downstream toward the output line. Sensing means is associated with each of the conveyors for sensing predetermined accumulations of articles on the conveyors. Means is provided for comparing the accumulations of articles on the respective conveyors and for providing a singal to the flow director when less than all of the conveyors have an accumulation equal to or greater than the predetermined accumulation. The flow director is caused to direct articles only to conveyors not having an accumulation of articles thereon equal to or greater than the predetermined accumulation.

A method embodying the present invention for controlled feeding of a stream of articles from an input line to an output line includes the steps of providing a moving path for the articles, introducing the stream of articles into the path and gating the leading one of the articles onto the output line.

According to an aspect of the invention, the leading one of the articles is blocked at the downstream end of the path to produce a column of articles. When the column exceeds a predetermined length the second of the articles is blocked at the downstream end of the path to maintain the column while the leading article is gated onto the output line. The second article is released to allow movement of the column following the gating of the leading articles.

According to another aspect of the invention, a plurality of generally parallel paths are provided for the articles and the articles are directed into the paths to form a plurality of generally parallel streams of articles. An accumulation of articles in each path in excess of a predetermined accumulation is sensed and the accumulations of articles in their respective paths are compared. Articles are directed away from a path having an excessive accumulation of articles compared to its neighbors and into a path not having such an excessive accumulation.

DESCRIPTION OF A PREFERRED EMBODIMENT

Overall System

Figure 1:
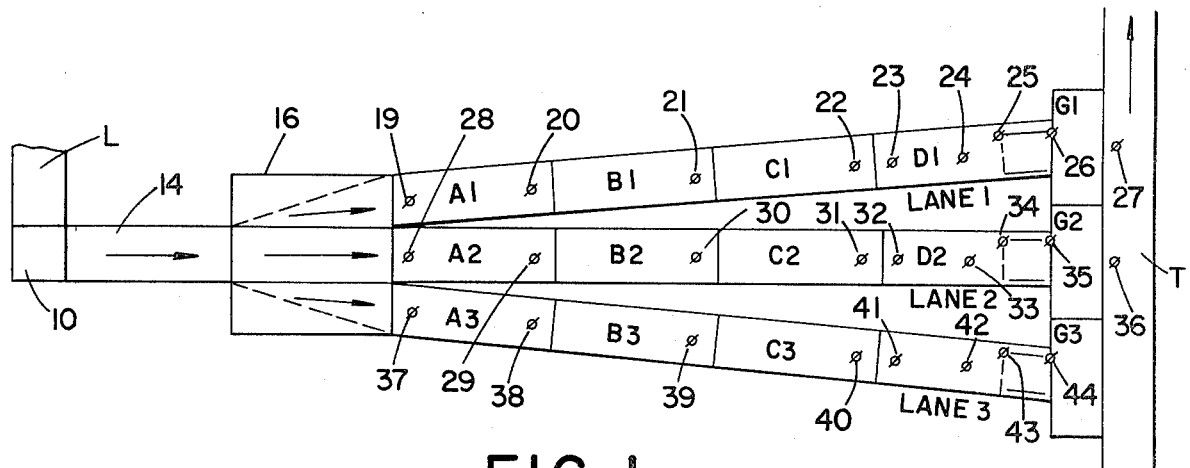
FIG. 1 is a diagrammatic plan view of a system embodying the present invention.

Referring now to the drawings and initially to FIG. 1, an accumulator and gating mechanism embodying the present invention is shown between an input line L from a binder (not shown) and a trimmer infeed conveyor T. Magazines or the like are bound in a known manner at the binder and are then conveyed to a pilemaker 10 and stacked into piles. In the absence of the accumulating and gating system of the present invention, piles from the pilemaker 10 would be sent directly to trimmer infeed conveyor T for feeding to a trimmer (not shown). The system of the present invention receives piles from the pilemaker 10 and feeds them to trimmer infeed conveyor T in a controlled manner. The system serves to match the input capacity of the trimmer with the output capacity of the binder by providing controlled temporary storage therebetween.

As shown in FIG. 1, the system includes an infeed conveyor 14, a flow director 16, and three conveyor lanes identified as lanes 1, 2 and 3. Each lane includes four conveyor sections identified as A, B, C and D and a gate, G. Conveyor section A of lane 1 is identified as A1, conveyor section B of lane 2 is identified as B2 and so on. Similarly, the gate for lane 1 is identified as G1 while the gates for lanes 2 and 3 are identified as G2 and G3, respectively. The infeed conveyor 14 and each of the conveyor sections A1 through D3 is an independently driven and controlled section.

Each conveyor section A1 through D3, gates G1 through G3 and trimmer infeed conveyor T has associated with it one or more photodetector relays 19 through 44 as shown in FIG. 1. The detectors 19 through 24 of lane 1, 28 through 33 of lane 2, and 37 through 42 of lane 3 are mounted beneath their respective conveyor sections and indicate the presence of a stalled magazine pile on the conveyor section overhead in a manner to be described below.

Detectors 25 and 26 of lane 1 and the corresponding detectors 34, 35 for lane 2 and 43, 44 for lane 3 are mounted alongside their respective lanes. Each of these detectors actuates its contacts when the light path across the lane to a reflective device is interrupted by the presence of a magazine pile.

Photodetectors 27 and 36 on trimmer infeed conveyor T are mounted above the conveyor and actuate their contacts when the light path to a reflective device beneath the conveyor is blocked by the presence of a magazine pile.

At the end of the D conveyor section for each lane there is positioned a restrictor identified as 60, 62 and 64, respectively, for lanes 1, 2 and 3. Each restrictor operates in a manner described below to restrain piles from entering the respective gates G1, G2 and G3 under the appropriate circumstances, as, for example, when a preceeding pile is being gated onto trimmer infeed conveyor T.

The function of flow director 16 is, as its name indicates, to direct piles into the appropriate lanes as the piles are received from infeed conveyor 14. Normally, piles are directed in sequence to lanes 1, 2 and 3. If, however, one or more lanes are "backed up" the flow director will, upon appropriate indication from the backed up lane, feed piles to only those lanes which are not backed up.

In operation, magazines piles from the pilemaker 10 are fed from infeed conveyor 14 to flow director 16 where, normally, they are directed in sequence to lanes 1, 2 and 3. The piles proceed on each conveyor section A, B, C and D to the entrance of gate G1, G2 or G3. When piles have accumulated upstream beyond the entrance to restrictors 60, 62, 64 and a pile is detected in position at the entrance to the respective gate a gating cycle is initiated. The lane restrictor is first actuated to prevent further advance of succeeding piles and the gate is then enabled to feed a pile onto the trimmer infeed conveyor T. At the end of the gating sequence the restrictor is retracted and the piles are permitted to advance so that the procedure can be repeated.

In the event of a trimmer malfunction or slowdown no gating is permitted and a column of piles will accumulate behind each of the lane restrictors. If the column extends beyond the upstream end of the C conveyor section a "back up" has occurred and the drive for that section is turned off. As the backup extends beyond the upstream end of each conveyor section, the drive for that section is turned off. If backups occur on fewer than all lanes, the flow direction is ordered not to feed the backed-up lanes. When the trimmer again becomes operative the gate will again become enabled to feed piles to the trimmer infeed conveyor T and the backlog will soon be cleared and normal operation resumed.

Conveyor Sections

Figure 2:
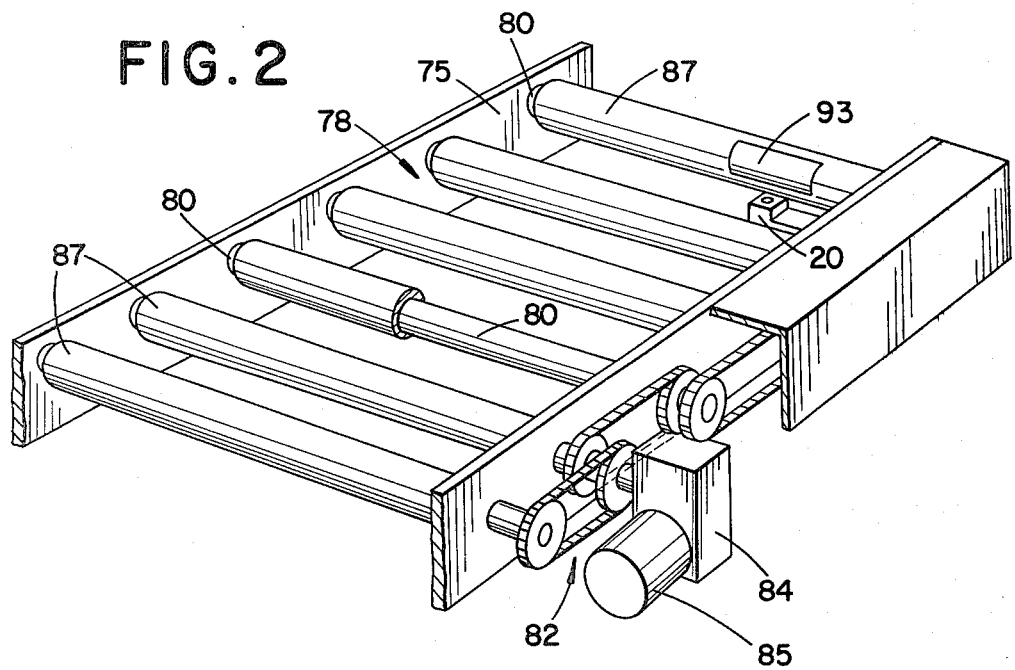
FIG. 2 is a perspective view of a typical conveyor section employed in the system of FIG. 1.

As shown in FIG. 2, each of the conveyor sections 14 and A1 through D3 is a "rollerveyor" on which piles are transported upon rotating rollers rather than upon a moving belt. Each conveyor section includes a frame 75 which supports a series of evenly spaced transversely extending rollers generally indicated at 78. Each roller 78 includes an inner shaft 80 which is mounted in frame 75 for rotation about its own axis. The shafts 80 are rotated by means of a drive belt arrangement 82 extending the length of the section. The belt, in turn, is coupled by suitable means 84 to a drive motor 85. Each shaft 80 is provided with a roller sleeve 87 of rubber or other high friction material. Roller sleeves 87 are coupled to the respective shafts 80 for rotation therewith by friction only. Under the normal load of magazine piles the friction coupling between shaft and roller sleeve is sufficient to cause the sleeve to rotate with the shaft and convey magazine piles along the conveyor section. When, however, the load becomes excessive, as when a column of piles is backed up behind the restrictor, the roller sleeves will slip. This slipping is used to detect stalled magazine piles as described below.

Each of the conveyor sections A1 through D3 has, as mentioned above, one or more photodetector relays mounted thereon for detecting stalled piles. Each of the detectors 19 through 24 of lane 1, 28 through 33 of lane 2 and 37 through 42 of lane 3 are mounted as shown in FIG. 2 at the locations along the respective conveyor sections shown in FIG. 1. As shown in FIG. 2, the detector identified as 20 is mounted below the rollers 78 and aimed at a roller directly above. The sleeve of that roller is provided with a strip of reflective tape 93. When roller sleeve 87 is rotating photodetector 20 will detect periodic light pulses reflected from reflective surface 93 and the photodetector relay contacts will remain actuated. If, however, roller sleeve 87 ceases to rotate, as when the load imposed by a backup of magazine piles has decoupled it from its shaft 80, detector 20 will receive no light and dark transition pulses from the sleeve and its contacts will be released.

Each of the photodetectors 19 to 24, 28 to 33 and 37 to 42 is preferably a Model TR-6 module available from Microswitch, Inc.

Each of the conveyor sections 14 and A1 through D3 is preferably a Shuttleworth conveyor section manufactured by Shuttleworth, Inc. of Huntington, Ind.

Flow Director

Figure 3:
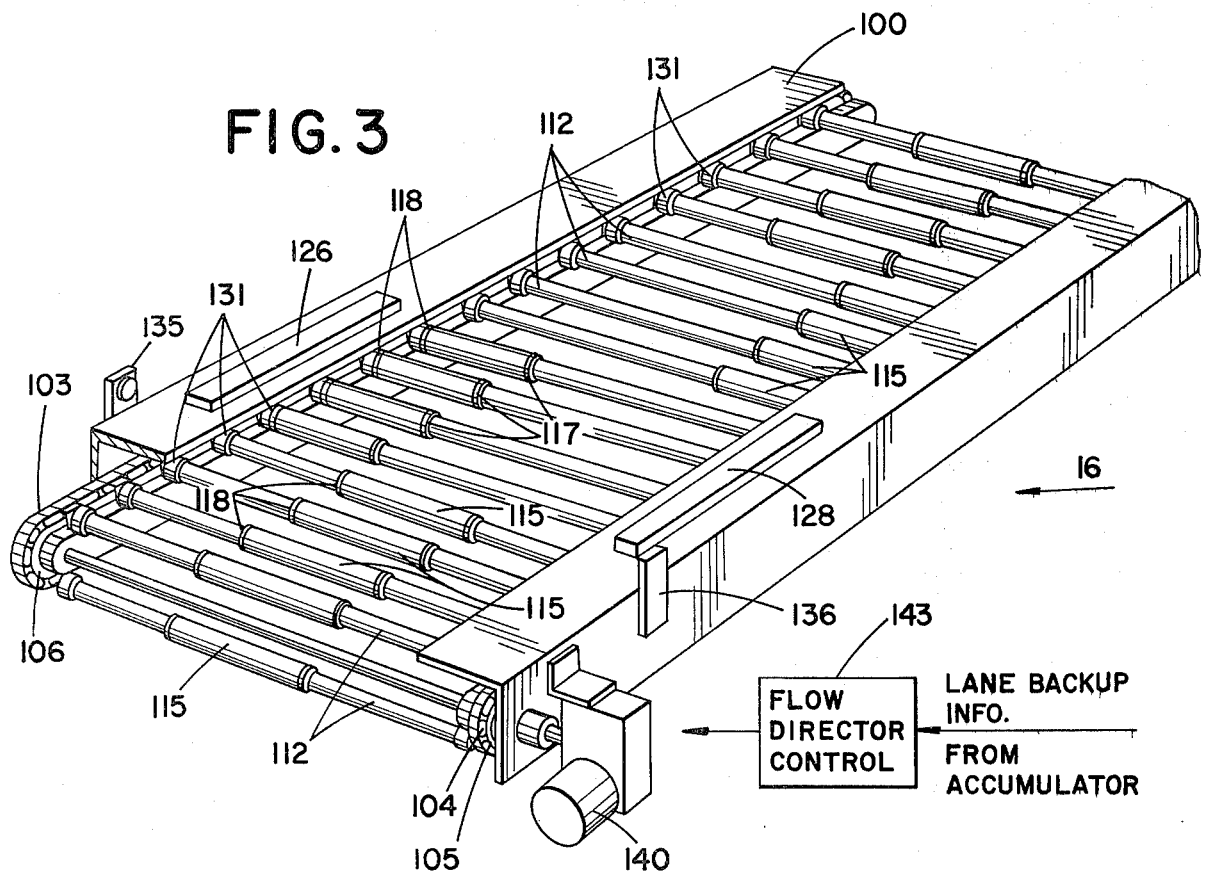
FIG. 3 is a perspective view of the flow director employed in the system of FIG. 1.

Referring now to FIG. 3, flow director 16 includes a frame 100 wide enough at its end adjacent conveyor sections A to extend across all of lanes 1, 2 and 3. At each side of frame 100 there is supported a drive chain 103 and 104 which are driven by sprockets 105, 106. Extending between chains 103 and 104 and supported thereby is a series of spaced-apart shafts 112 which form a conveyor. Mounted on each shaft 112 is a sleeve 115 which is slideable along the shaft. Discs 117, 118 of magnetic material are supported at respective ends of each sleeve 115. Electromagnets 126 and 128 are mounted on opposite sides of frame 100 near the entrance to the flow director for attracting discs 117, 118 as described below. Magnetic discs are provided at each end of each shaft 112 to retain discs 117, 118 in contact therewith by magnetic attraction. A photodetector 135 is mounted on one side of flow director 16 at the entrance thereto and a reflective target 136 is mounted on the opposite side of the flow director.

Drive sprockets 105, 106 are coupled by suitable means to a drive motor 140 which is energized by the accumulator and gating mechanism control system as described below. The flow direction also includes a control system 143 which controls the directing of incoming piles to the proper downstream lane. The control system receives information from the accumulator and gating mechanism control system as to backup of piles in lanes 1, 2 and 3 as described below. This information enables the flow director controls 143 to avoid feeding magazine piles to lanes which are backed up.

The flow director 16 including the control system 143 is available from Hi-Speed Checkweigher, Inc. of Ithaca, N.Y.

In operation, the sleeves 115 are returned to the middles of the shafts 112 by a centering device (not shown) as the shafts are returned beneath the surface to the entrance end of the flow director. Piles from infeed conveyor 14 are delivered onto a group of sleeves 115 at the entrance to flow director 16. As each pile is conveyed from the entrance of the flow director it is detected by photodetector 135 which transmits a signal to flow director controls 143 indicating the presence of a pile. The flow director controls determine whether the pile should be fed to the next lane in sequence or by-passed to a different lane. An appropriate signal is then delivered to electromagnet 126 or to electromagnet 128 or to neither of them. If the pile is to be fed to lane 1 or lane 3 the sleeves are attracted to the appropriate side of the flow director by the corresponding electromagnet and are retained in that position by attraction between discs 117 or 118 and the corresponding magnetic disc 131 at the end of the shaft 112. If the pile is to be delivered to lane 2 then no signal is sent by flow director controls 143 and the sleeves remain in the center lane. The pile thereon is then delivered to lane 2 of the accumulator.

Restrictor and Gate

Figure 4:
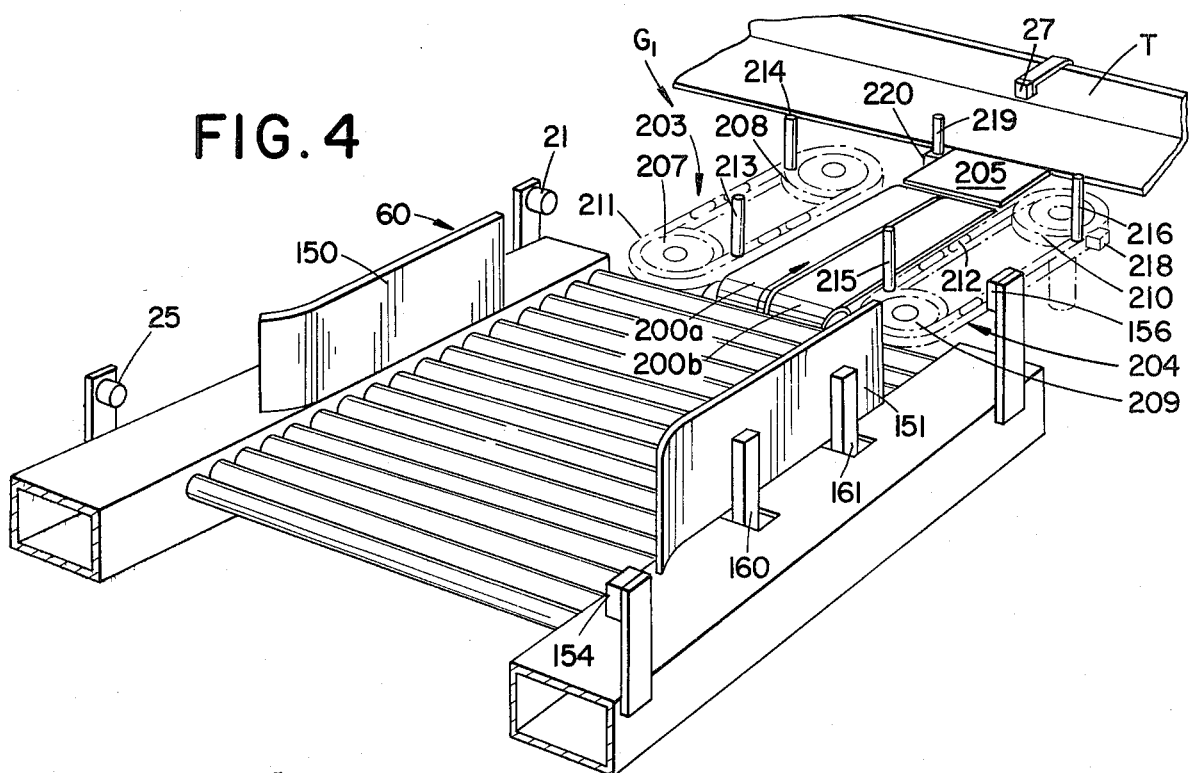
FIG. 4 is a perspective view of the downstream end of one of the lanes of FIG. 1 showing the restrictor and gate.

FIG. 4 illustrates the restrictor, photodetector, gate and portion of trimmer infeed conveyor T located at the end of each D conveyor section. FIG. 4 will be described as applying to lane 1, it being understood that the description applies to lanes 2 and 3 as well.

As shown in FIG. 4, restrictor 60 is mounted at the end of conveyor section D1 and includes a pair of restrictor plates 150, 151 supported on opposite sides of the conveyor section. Each restrictor plate has a high friction inner surface of rubber or the like. The restrictor plates may be advanced toward each other to contact and restrain a horizontal column of from one to three magazine piles.

The photodetector 25 (FIG. 1) is mounted at the entrance to restrictor 60 and is aimed at a reflective target 154 on the opposite side of conveyor section D1. The photodetector 26 (FIG. 1) is mounted at the entrance to gate G1 opposite a reflective target 156. Photodetector 27 (FIG. 1) is mounted above the surface of trimmer infeed conveyor T opposite a reflective target beneath a slot (not shown) in the surface of the conveyor T. Each of the photodetectors 25, 26 and 27 is provided with one or more sets of contacts. The contacts of detectors 25 and 26 are actuated when a magazine pile is between the detector element and the respective targets while those of detector 27 are actuated in the absence of a magazine pile.

The photodetectors 25 to 27, along with corresponding photodetectors 34 to 36, 43 and 44 in lanes 2 and 3 are preferably TR-3 modules available from Microswitch, Inc.

Figure 5:
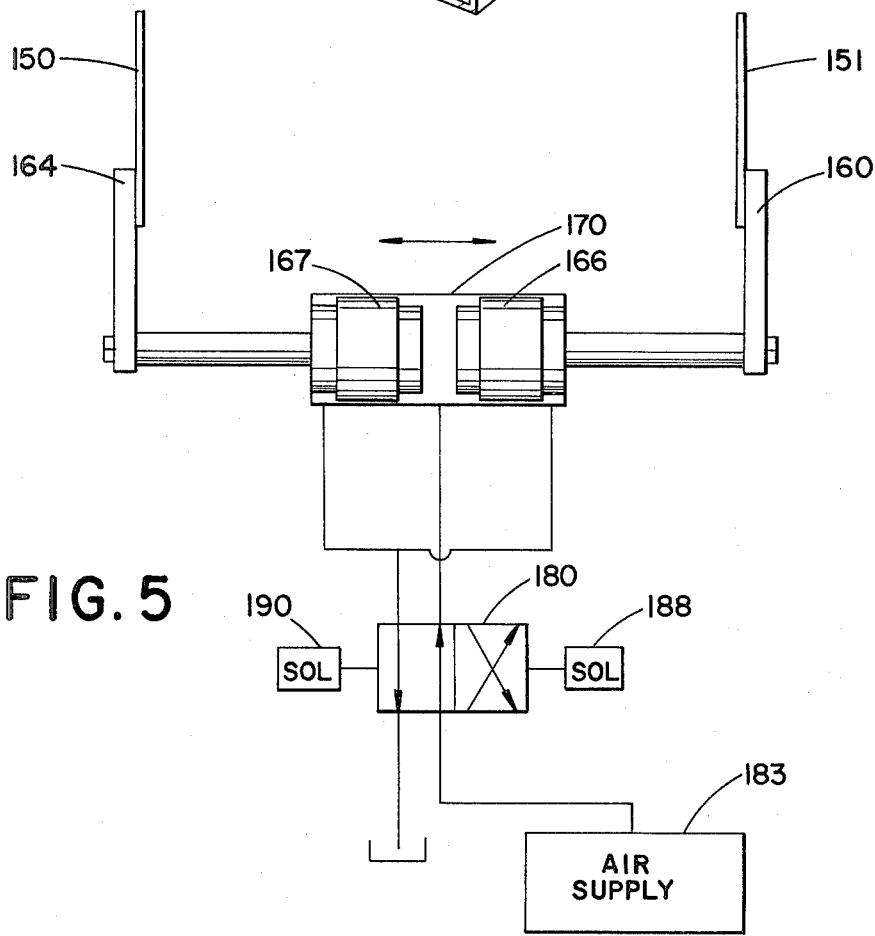
FIG. 5 is a diagrammatic end view of the restrictor shown in FIG. 4 and the means for operating it.
Figure 6:
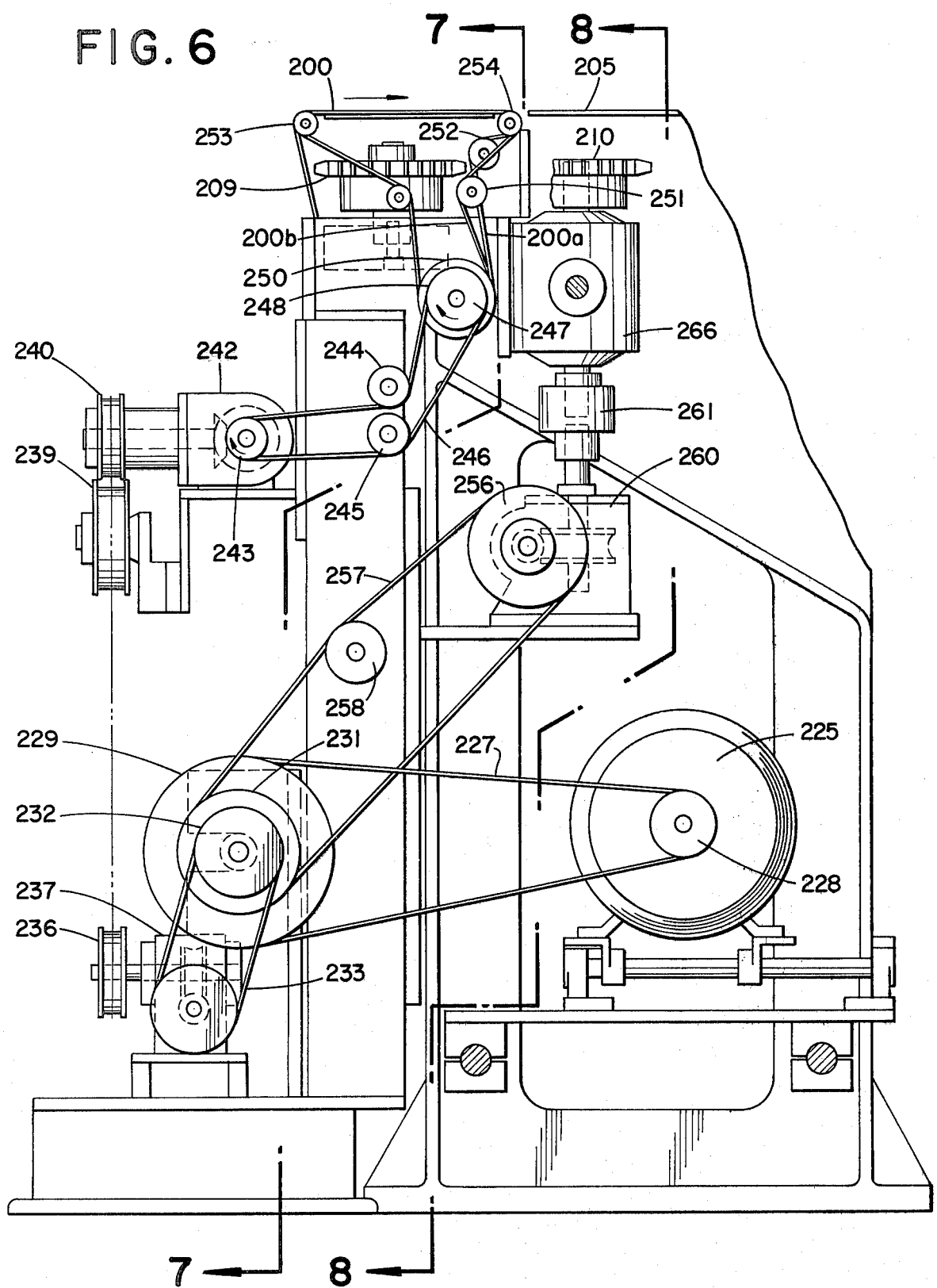
FIG. 6 is a side elevational view of a gate apparatus.

As shown in FIGS. 4 and 5, each restrictor plate 150, 151 is supported by a pair of vertical bars 160, 161 for plate 151 and 164 for plate 150, the remaining bar not being shown. These bars extend through openings in the frame of conveyor section D1 and through a linkage to a pneumatic operating mechanism. FIG. 6 shows the arrangement for bars 160 and 164 only, it being understood that the arrangement for the remaining bars is the same. Each bar 160, 164 is connected to a piston 166, 167 which is slidable in cylinder 170. Cylinder 170 is connected at each end and at its center to a pneumatic valve 180 which in turn is connected to a source of pneumatic pressure 183. Valve 180 is controlled by an advance solenoid 188 and a retract solenoid 190. Energizing advance solenoid 188 causes valve 180 to direct air from source 183 to both ends of pneumatic cylinder 170 thereby urging pistons 166, 167 and restrictor plates 150, 151 toward each other to engage opposite sides of a column of magazine piles. Energizing solenoid 190 causes valves 180 to direct air from source 183 to the center of pneumatic cylinder 170 and thereby retract restrictor plates 150, 151 to their normal standby positions.

Figure 7:
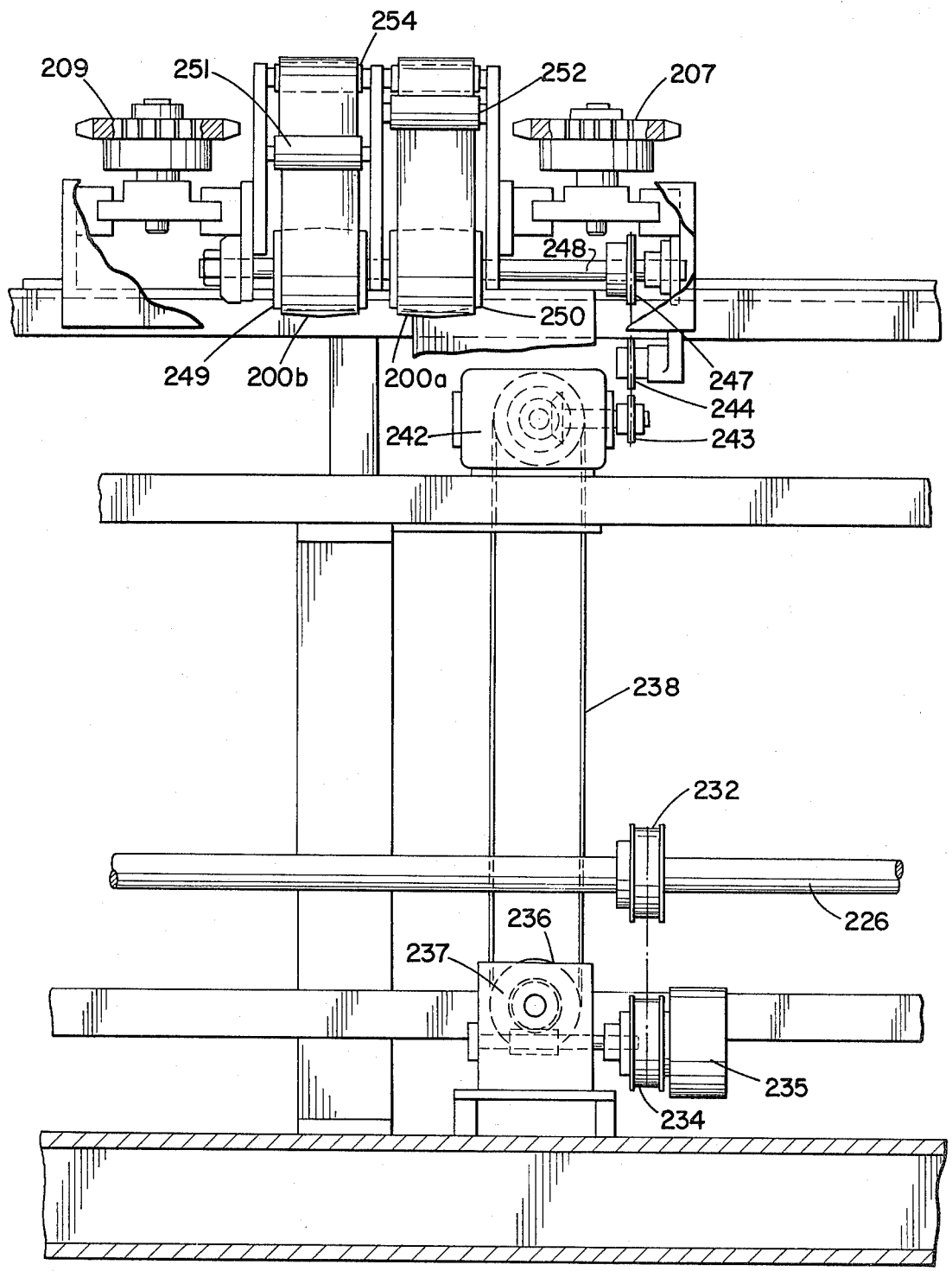
FIG. 7 is a view of the gate apparatus along the line 7—7 of FIG. 6.
Figure 8:
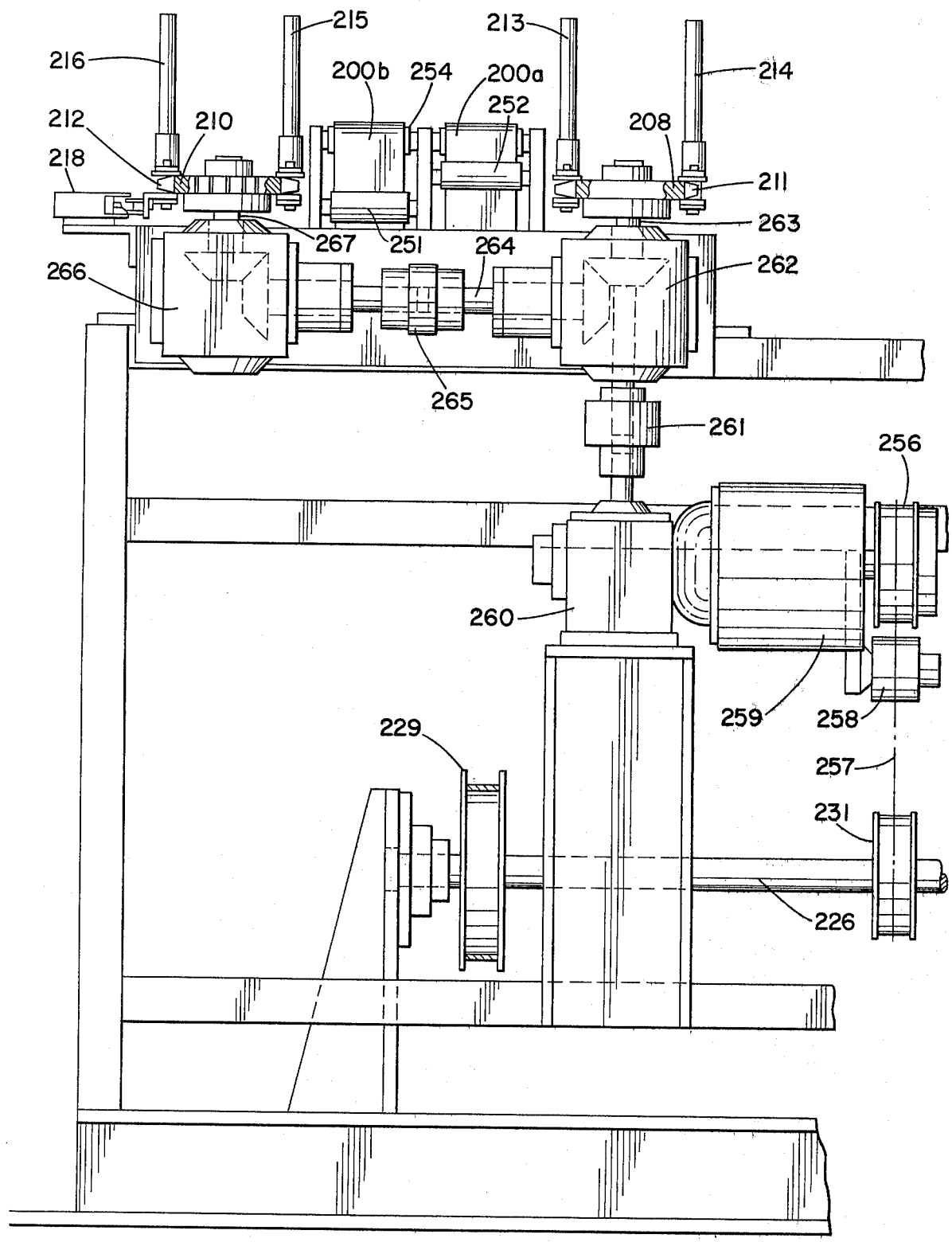
FIG. 8 is a view of the gate apparatus along the line 8—8 of FIG. 6.

Referring now to FIGS. 4 and 6 to 8, gate G1 includes a central belt conveyor 200 flanked on each side by a gating pin drive mechanism generally indicated at 203 and 204. Conveyor 200 has two belts 200a and 200b and runs to a shelf 205 between the conveyor and the trimmer infeed conveyor T. Each gating pin drive mechanism 203, 204 includes a pair of sprockets, identified as 207 and 208 for mechanism 203 and as 209 and 210 for mechanism 204. Each set of sprockets drives a chain 211, 212. Each chain carries a pair of gating pins identified as 213 and 214 for mechanism 203 and as 215 and 216 for mechanism 204. Chains 211 and 212 are somewhat below the surface of conveyor 200 while gating pins 213 to 216 extend upwardly above the conveyor surface as shown in FIGS. 6-8. The distance between gating pins 213 and 215 is less than the width of a magazine pile so that these pins stop piles at the entrance to the gate.

At the home position of the gating pins, a normally closed switch 218 is held open by pin 216 for a purpose which will be described below. A feed pin 219 on trimmer infeed conveyor T closes a switch 220 to provide a synchronizing signal to the system when the trimmer infeed conveyor feed pins are in the proper position to receive magazine piles from the three gates G1, G2, and G3.

The three gates are powered by a drive motor 225 (FIG. 6) which rotates a common drive shaft 226 (FIGS. 7 and 8) through a belt 227 connected between sheaves 228 and 229. Drive shaft 226 in turn drives a pair of sheaves 231 and 232 for each gate. Sheave 231 transmits the driving force for the gating pin drive mechanisms 203 and 204 of its gate while sheave 232 transmits the driving force for the conveyor 200 of that particular gate. Corresponding sheaves transmit driving force from shaft 226 to the gating pin drive mechanisms and gate conveyors for the remaining gates in the same manner as described below for sheaves 231 and 232.

The drive path from sheave 232 to conveyor 200 is, as shown in FIGS. 6 and 7, through a belt 233 to a sheave 234 connected to the input element of an electrically operated clutch 235. The output shaft of clutch 235 drives a sheave 236 through a worm gear box 237. Sheave 236 is connected by means of belt 238 through idler 239 to a sheave 240 which is connected to the input of a worm gear box 242. A sprocket 243 mounted on the output shaft of gear box 242 is connected by means of idlers 244 and 245 and a belt 246 to a sprocket 247. Sprocket 247 is mounted upon a shaft 248 which also supports a pair of drive pulleys 249 and 250. These pulleys drive conveyor belt sections 200a and 200b which are supported by take-up pulleys 251 and 252 and rollers 253, 254.

The drive path from sheave 231 to gating pin drive mechanisms 203, 204 includes a sheave 256 which is driven by a belt 257 through an idler 258. Sheave 256 is connected to the input shaft of a combined clutch and brake unit 259 which has its output shaft connected to a worm gear box 260. The output shaft of gear box 260 is connected through a coupling 261 to another gear box 262. Gear box 262 has a pair of output shafts 263 and 264. Shaft 263 is connected to and drives sprocket 208 which in turn drives chain 211. As shown in FIG. 7, sprocket 207 is an idling sprocket driven by chain 211.

The other output shaft 264 of gear box 262 is connected through a coupling 265 to the input shaft of another gear box 266. The output shaft 267 of gear box 266 is connected to sprocket 210 which drives chain 212. Sprocket 209 is, like sprocket 207, merely an idling sprocket and is driven by chain 212. Switch 218 is mounted adjacent sprocket 212 so that it is actuated by gating pin 216 when the pin is at its home position.

The gear ratios for the various gear boxes in the drive path to the conveyor 200 and to the gating pin drive mechanisms 203 and 204 are adjusted such that the speed of travel of gating pins 213-216 is higher than the surface speed of belts 200a and 200b for reasons to be described below.

In operation, main drive motor 225 operates continuously and rotates main drive shaft 226 during operation of the system. Conveyor 200 is driven, however, only when clutch 235 is actuated to couple rotation of drive shaft 226 to shaft 248 of drive pulleys 249 and 250 through the various belts and gear boxes described above.

Likewise, the output shaft of gear box 260 (FIG. 8) is driven and drives output shafts 263 and 264 to operate the gating pin drive mechanisms 203 and 204 only when combination brake and clutch unit 259 is energized to release the brake and activate the clutch.

A magazine pile approaching gate G1 is blocked by gating pins 213 and 215. When the proper conditions for gating have been met, as described below, conveyor 200 is started along with sprockets 208 and 210, which cause gatings pins 213 and 215 to move toward the trimmer infeed conveyor T. The magazine pile is carried on conveyor 200 toward the trimmer infeed conveyor. Since the speed of the gating pins is higher than that of conveyor 200 gating pins 213 and 215 move rapidly away from the magazine pile while gatings pins 214 and 216 approach the pile from the rear. The relative speed of the gating pins and conveyor 200 is such that pins 214 and 216 contact the rear of the magazine pile as it is delivered by conveyor 200 onto surface 205 and push the pile onto trimmer infeed conveyor T. Pins 214 and 216 then proceed to their home positions where pin 216 actuates switch 218. This stops the pins in the home position as described more fully below.

Restrictor 260 is then caused to release the next magazine pile which proceeds to the entrance of gate G1. The same sequence is then carried out to gate that pile onto trimmer infeed conveyor T.

CONTROL SYSTEM

The control system for the present invention includes various control relays designated generally by the circles at the right hand side of FIGS. 9 to 13. A brief indication of the function of each relay is printed adjacent the relay symbol. Each relay coil is designated by a reference numeral and the contacts of each relay are identified by that reference numeral together with a letter designation, for example, 301a, 301b, and so on. Similarly, the contacts of photodetector relays 19 through 44 (FIG. 1) are also designated by the reference numeral for the detector followed by a letter designation.

Figure 9:
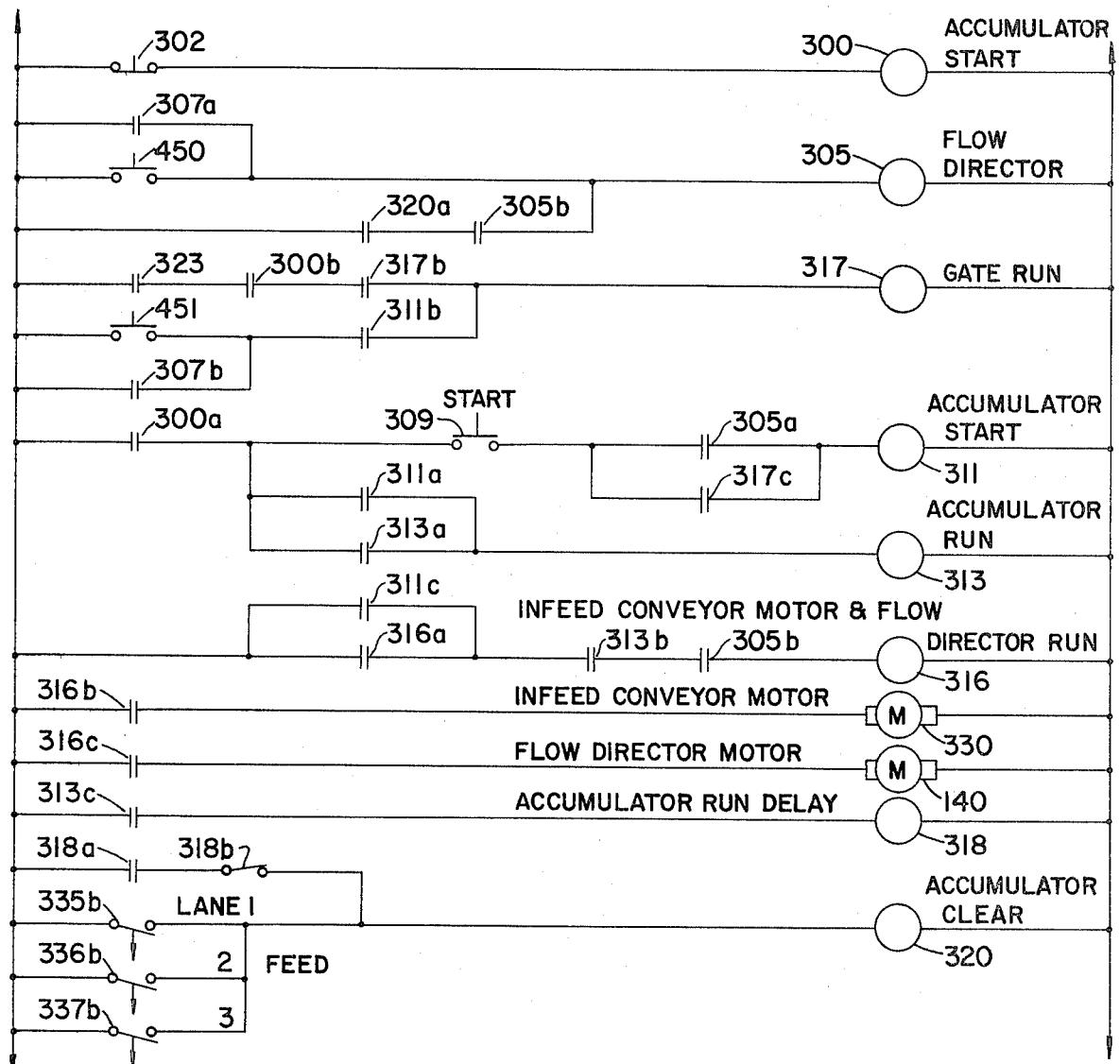
FIGS. 9 to 13 are each a schematic diagram of a portion of the control system of the present invention.
Figure 10:
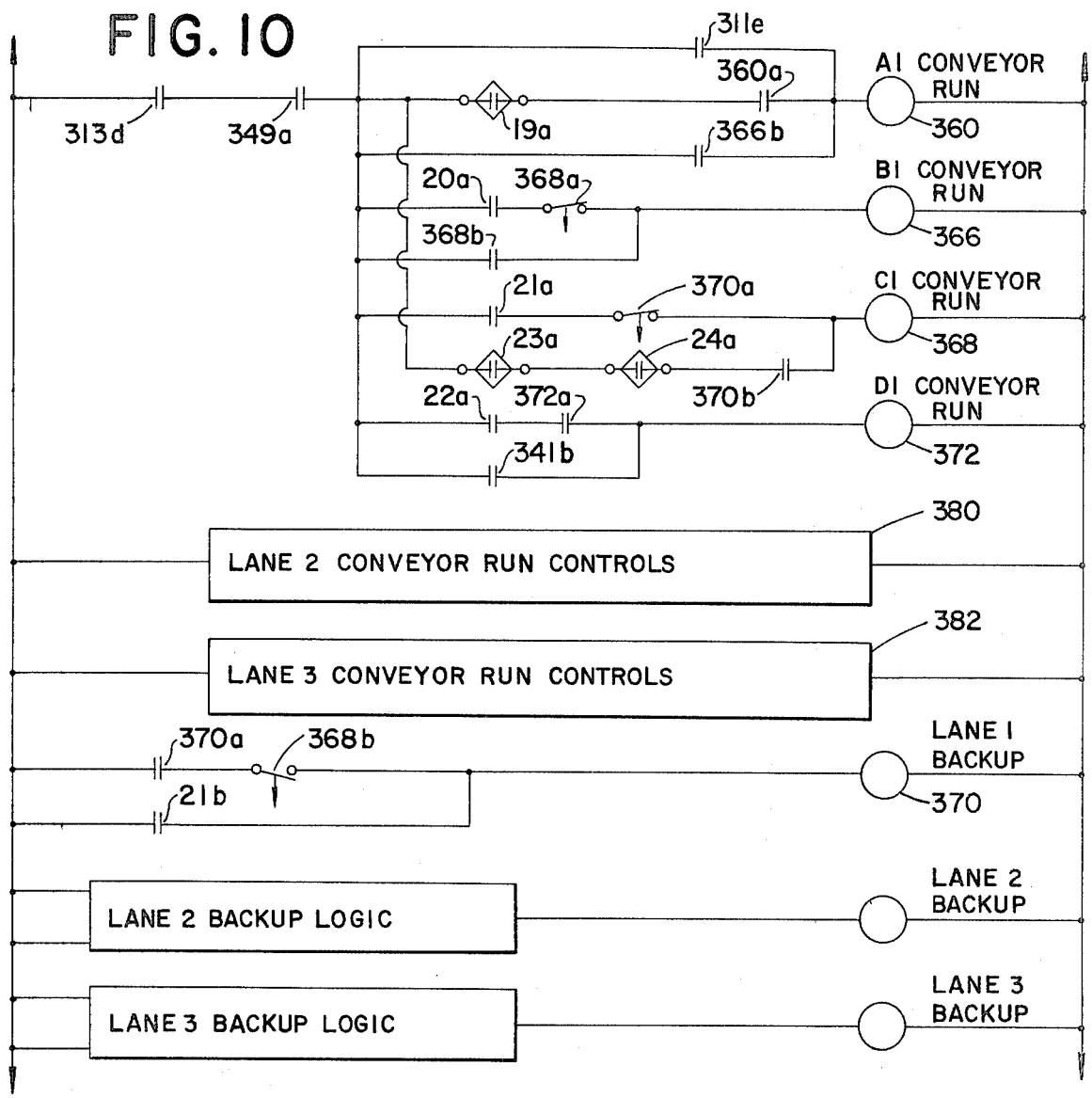
Figure 11:
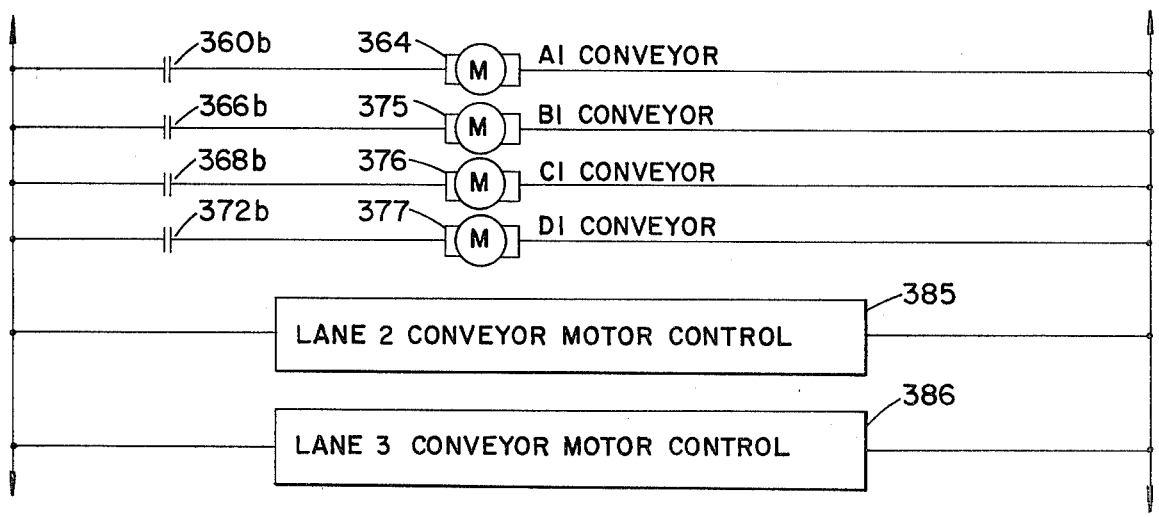
Figure 12:
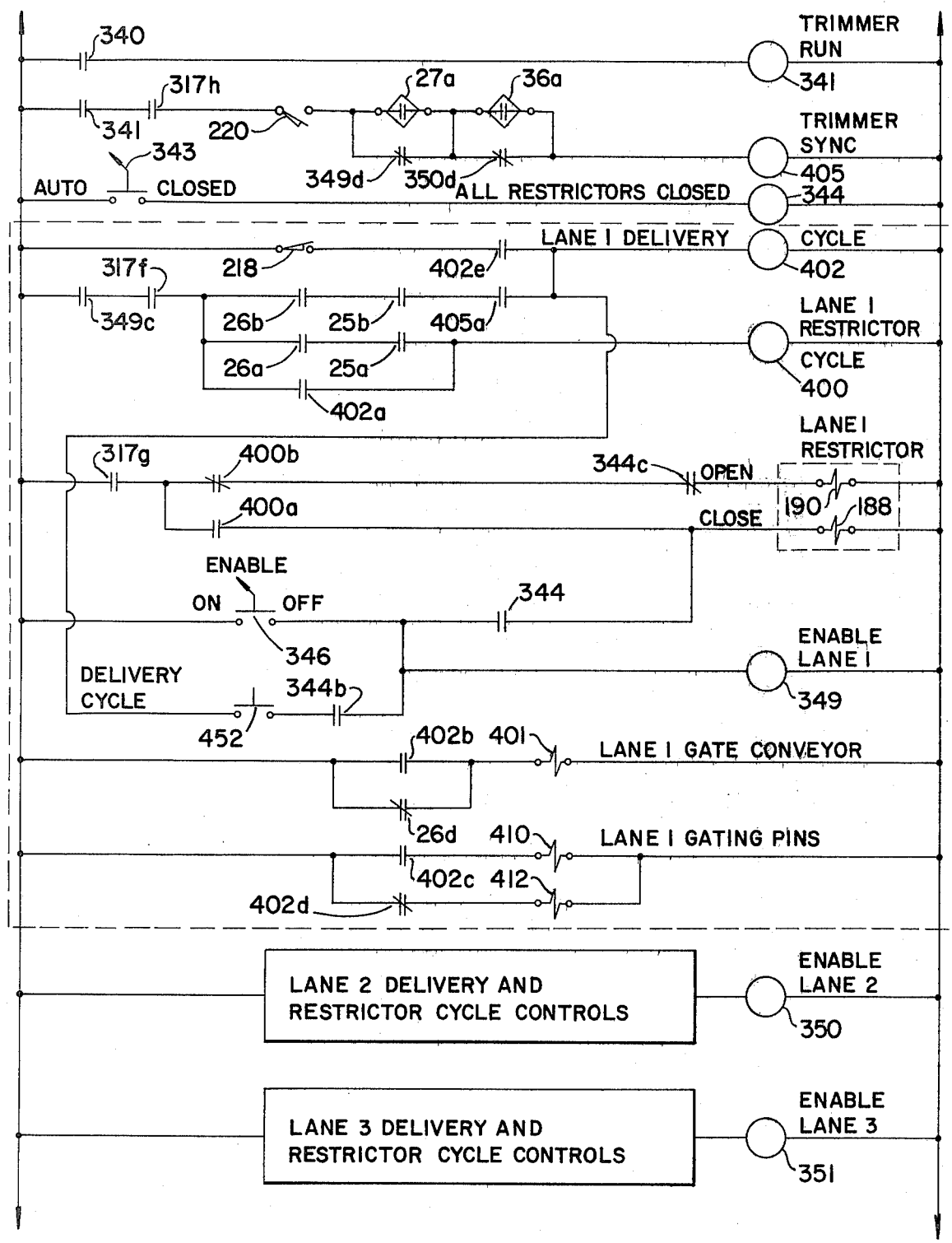
Figure 13:
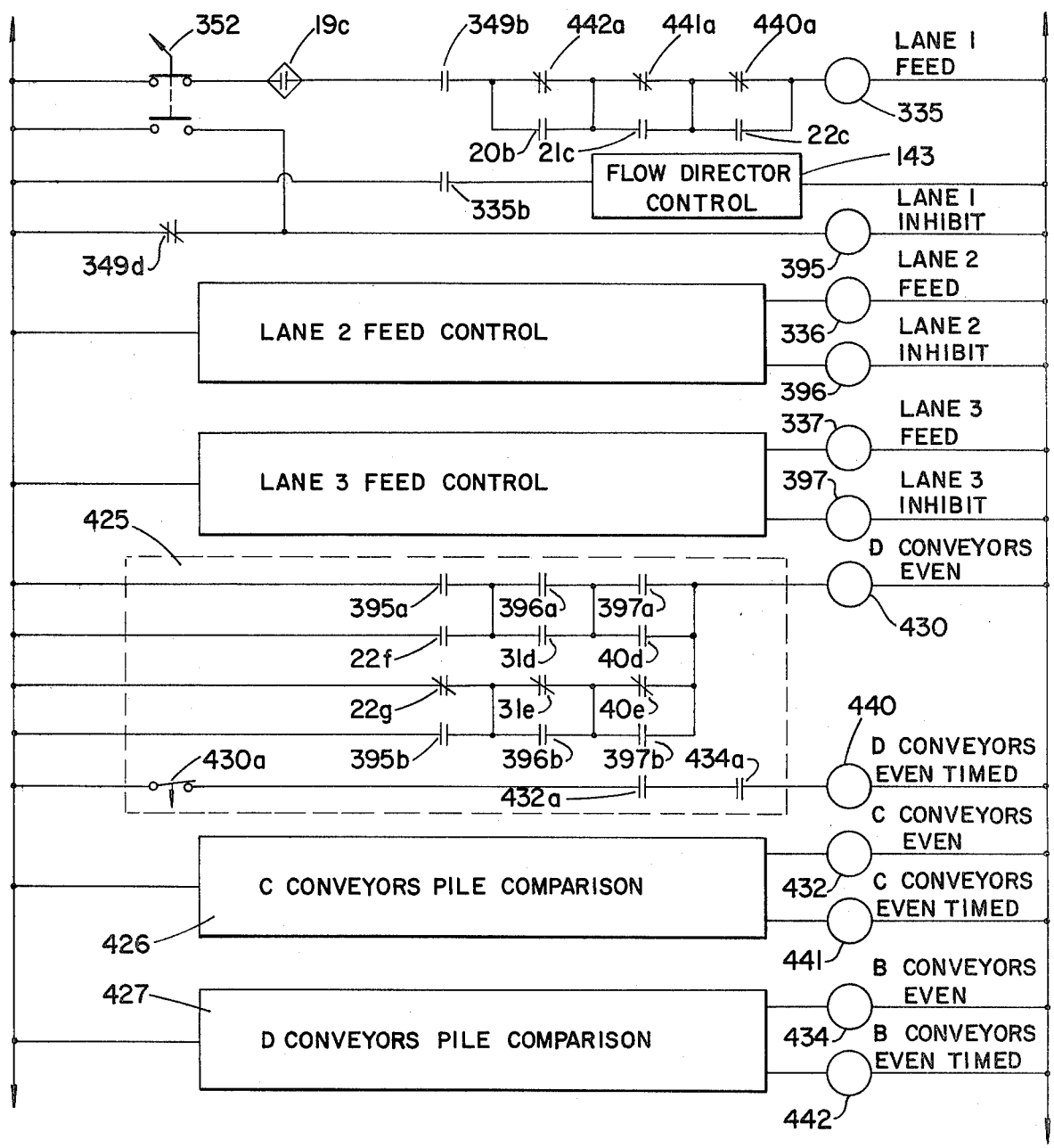

The control system is divided for purposes of description into a number of functional areas illustrated in FIGS. 9 to 13. FIG. 9 illustrates basically the overall start/run controls while FIGS. 10 and 11 illustrate the run/stop controls for the A to D conveyor sections of each lane. FIG. 12 illustrates the delivery and restrictor cycle controls for delivery of piles through the gates to the trimmer infeed conveyor. FIG. 13 illustrates the controls for comparing the "traffic" in the respective lanes and instructing the flow director to avoid feeding piles to a lane which is excessively backed up as compared to its neighbors. In each of FIGS. 10-12 where the control arrangement or a significant part thereof is identical or perfectly analogous for all three lanes only the controls for lane 1 have been shown in detail. The controls for lanes 2 and 3 are shown only as blocks in order to reduce the complexity of the drawings. Similarly, in FIG. 13 traffic is compared in the 3 lanes for back up of the B, C and D conveyor sections. Only the comparison and control arrangement for the D conveyor sections is shown in detail, however, arrangements for the B and C conveyor sections being in all respects analogous to that for the D sections.

A detailed description of the control system will be made in conjunction with a detailed description of operation of the system.

Prior to starting operation, a number of initial conditions are established, such as switch positions and relay actuations which occur when power is turned on. In FIG. 12, restrictor switch 343 will be set for automatic restrictor operation on all lanes so that restrictor relay 344 is not energized. Likewise, the enable switches for each of lanes 1, 2 and 3, such as the enable switch 346 for lane 1, will be closed unless one of the lanes is not to be enabled for the particular run to deliver piles through its gate to the trimmer infeed conveyor. Trimmer run switch 340 is closed and actuates trimmer run relay 341 when the trimmer is running. In FIG. 13 the feed/inhibit switch for each lane, such as switch 352 for lane 1, will be set to the feed position unless the lane is not to receive piles from the flow director 16.

Referring now to FIG. 9, relay 300 is actuated through accumulator stop switch 302 when power is initially applied to the system and remains actuated so long as switch 302 is not opened. At the same time, flow director relay 305 is actuated by contact 307a of switch 307 which is closed for a predetermined time when power is turned on. The system may then be started by depressing accumulator start switch 309 which actuates accumulator start relay 311 through contacts 300a and 305a. Accumulator run relay 313 is then actuated through contacts 300a and 311a and is held through its own contact 313a. Start relay 311 also actuates gate run relay 317 through contacts 311b and contacts 307b of switch 307. Gate run relay 317 holds through its own contact, through accumulator stop contact 300b and through a switch 323 which is closed as long as all of gates G1, G2 and G3 are operating. Start relay 311 and accumulator relay 313 actuate infeed conveyor and flow director run relay 316 which in turn energizes infeed conveyor motor 339 and flow director motor 140. Start relay 311 and accumulator run relay 313 also actuate the A conveyor run relays such as A1 conveyor run relay 360 (FIG. 10) which in turn energizes the A conveyor motors such as A1 conveyor motor 364 (FIG. 11).

Accumulator run relay 313 actuates accumulator run delay relay 318 which actuates accumulator clear relay 320 through contacts 318a and slow operating contacts 318b. Relay 320 remains actuated so long as any one of lane feed relays 335, 336 or 337 (FIG. 13) is actuated. Each of these relays indicates that its respective lane is in condition to receive piles from flow director 16 as described below. Accumulator clear relay 320 provides a hold path for flow director relay 305.

Referring now to FIGS. 10 and 11 along with FIG. 1, operation of only the lane 1 conveyor sections will be described in detail, it being understood that operation in lanes 2 and 3 is identical.

The A1 conveyor run relay 360 is energized momentarily through accumulator start contacts 311e along with contact 349a of the lane 1 enable relay and contact 313d of the accumulator run relay 313. Conveyor run relay 360 holds through its own contact 360a and contact 19a of photodetector relay 19 which detects motion of the conveyor roller sleeves 87 (FIG. 2) at its position as described above. Conveyor run relay 360 energizes A1 conveyor motor 364 through contact 360b as shown in FIG. 11. B1 conveyor run relay 366 is actuated through contact 20a of photodetector relay 20 and through delayed release contact 368a of C1 conveyor run relay 368. The B1 conveyor motor 375 (FIG. 11) is energized by contacts 366b.

C1 conveyor run relay 368 is actuated through contact 21a of photodetector 21 and through delayed release contact 370a of lane 1 back up relay 370. Lane 1 back up relay 370 will not be actuated unless photodetector 21 detects a stalled pile at its position at the downstream end of conveyor B1. The D1 conveyor run relay 372 is actuated through contacts 341b of trimmer run relay 341 (FIG. 12) so long as the trimmer is running. The C1 and D1 conveyor motors 376 and 377 respectively (FIG. 11) are energized as the respective C1 and D1 conveyor run relays are actuated.

The lanes 2 and 3 conveyor run controls 380 and 382, respectively, operate in the same manner to energize the lanes 2 and 3 conveyor motors as indicated generally at 385 and 386 in FIG. 11.

Meanwhile, as shown in FIG. 13, the lane 1 feed relay 335 is actuated when photodetector 19 detects motion in the A1 conveyor provided that the lane 1 conveyors are not excessively backed up as compared to the other lanes. The result of this comparison is indicated by relays 440, 441 and 442 as described below. The lane 1 feed relay also has an actuation path through the contacts of photodetectors 20, 21 and 22 as soon as conveyor motion is detected at their locations. So long as lane 1 feed relay 335 is actuated contacts 335b to flow director control 143 are open and permit the flow director to feed magazine piles to lane 1.

In the same manner, lane 2 feed relay 336 and lane 3 feed relay 337 are actuated to allow the flow director to feed magazine piles to these lanes.

At this point in the operation of the system, the flow director is feeding magazine piles alternately to all of the lanes. The magazine piles proceed along each conveyor section of each lane until the leading pile is stopped at the entrance to gate G1, G2 or G3 by the gating pins 213 and 215 (FIG. 4). Piles then begin to accumulate behind the leading pile at the entrance to the gate.

Referring now to FIG. 12 along with FIG. 1, when photodetector 25 detects the presence of a magazine pile at the entrance to the restrictor at the same time that detector 26 detects a pile in position to be gated, then lane 1 restrictor cycle relay 400 is actuated through contacts 25a and 26a and through contacts of lane 1 enable relay 349 and gating mechanism run relay 317. Relay 400 actuates lane 1 restrictor close solenoid 188 through contacts 400a and opens the path to the restrictor open solenoid 190 through contacts 400b. The restrictors are thus closed to restrain the column of magazine piles from advancing during the gating operation.

At about the same time the belt conveyor for gate G1 is stopped when lane 1 belt clutch solenoid 401 which controls clutch 235 is deenergized by actuation of detector contacts 26d.

Lane 1 delivery cycle relay 402 is actuated to initiate a delivery cycle as soon as trimmer sync relay 405 is actuated. Relay 405 is enabled when each of photodetectors 27 and 36 for lanes 1 and 2, respectively, close their contacts indicating that open chain spaces are available on the trimmer infeed conveyor. Relay 405 is actuated when switch 220 is closed by trimmer infeed pin 219 (FIG. 4) indicating that the chain spaces of the trimmer infeed conveyor are in proper position for receiving magazine piles from the gates. Trimmer sync relay 405 actuates lane 1 delivery cycle relay 402 which holds lane 1 restrictor cycle relay 400 through contact 402a. Relay 402 also actuates lane 1 belt clutch solenoid 401 which controls clutch 235 (FIG. 7) and actuates the gating pin clutch solenoid 410 while releasing the gating pin brake solenoid 412. Solenoids 410 and 412 control the combination brake and clutch unit 259 (FIG. 8).

The leading magazine pile is then gated onto trimmer infeed conveyor T in the manner described above. Lane 1 delivery cycle relay 402 remains actuated through its own contact 402e and through switch 218. Switch 218 is normally closed but is held open by gating pin 216 when the gating pins are at their home positions. During the gating operation switch 218 is closed and opens when gating pin 216 is returned to its home position. This releases relay 402 which deenergizes gating pin clutch solenoid 410 and energizes brake solenoid 412. Lane 1 restrictor cycle relay 400 is also released to allow the restrictors to return to the open position. This permits the column to advance until the leading pile is stopped by gating pins 213 and 215 and the entire procedure is repeated.

It will be understood that the same procedure described above as applicable to lane 1 also occurs for lanes 2 and 3.

During the above described operation, photodetectors 19, 20, 21 and 22 for the A and C conveyor sections of lane 1 and the corresponding detectors for the remaining lanes are operative to detect the back ups of magazine piles on the respective downstream conveyor sections. This is accomplished in the manner described above by detecting nonrotation of the roller sleeve directly above the detector which indicates that the magazine piles have backed up to the point above that detector.

Generally, detection of a back up on a downstream conveyor section results in deenergizing the drive motor of that section. The D sections, however, are not shut down as long as the trimmer is operating. If the column of backed up magazine piles become sufficiently long each conveyor section in a lane may be shut down. Usually, however, the cause of the back up will be corrected before an entire lane is shut down and the system will automatically correct the back up.

Also, during operation the lengths of the columns in the various lanes are continuously compared and the flow director is instructed not to feed a lane which is excessively backed up as compared to its neighbors.

Referring to FIG. 10, it is apparent that the D conveyor sections, exemplified by section D1 conveyor run relay 372, will remain energized through trimmer run contact 341b so long as the trimmer is running. The D1 conveyor run relay 372 will also remain energized after the trimmer is stopped until back up detector 22 detects a stalled pile. Once the D1 conveyor run relay has released, however, it cannot be actuated unless the trimmer is again running and trimmer run relay 341 is actuated. Whether or not the D1 conveyor section is running, C1 conveyor run relay 368 will be released if detector 21 at the downstream end of conveyor section B1 detects stalled piles at that point. At the same time, detector contacts 21b will actuate lane 1 back up relay 370. The shutdown of the B1 and finally A1 conveyor sections will occur in turn if detector 20 and then detector 19 detect a continuing backup of magazine piles in lane 1.

The operation described above for lane 1 is the same for lanes 2 and 3.

If a backup, on lane 1 for example, has proceeded only to detector 20 when the trimmer resumes running or some other cause for the backup is alleviated, the backup is handled and normal operation resumes as follows. With trimmer run relay 341 actuated the D1 conveyor will be running and will deliver piles to gate G1. When both detectors 23 and 24 detect no stalled piles at their positions on conveyor section D1 then C1 conveyor run relay 368 will be actuated through contacts 23a, 24a and 370b of lane 1 backup relay 370. This will actuate B1 conveyor run relay 366, and A1 conveyor run relay 360 if the latter was not already actuated.

Piles are advanced until detectors 23 and 24 again detect stalled piles. Conveyor run relay 368 is then released and in turn releases B1 conveyor run relay 366. When relay 368 is released lane 1 backup relay 370 is held only through backup detector contact 21b and only if a backup still exists to the location of detector 21. If detector 21 still indicates a backup C1 conveyor run relay 368 will again be actuated when detectors 23 and 24 indicate no stalled piles. Piles will again be advanced until detectors 23 and 24 indicate stalled piles at which time relay 368 will again release. If detector 21 then indicates no stalled piles lane 1 backup relay 370 will release and C1 conveyor run relay 368 will be actuated through contacts 21a and 370a. Operation will then proceed in the normal manner described above.

A backup on lane 2 or 3 will be handled in the same manner.

Meanwhile with reference to FIG. 13, if the backup reaches detector 19, the lane 1 feed relay 335 will be released and instruct flow director control 143 not to feed to lane 1. Short of that, however, relay 335 may be released temporarily to maintain even traffic in the lanes as described below.

The actuation path of lane 1 feed relay 335 includes detector contacts 22c, 21c and 20b which open, respectively, on D1, C1 and B1 conveyor section backups. Each contact is bypassed by a contact of a relay, 440, 441 and 442, respectively, which opens only if for any set B, C or D of conveyor sections the three lane backup detectors do not indicate the same backup condition for all three lanes at about the same time. In other words, if all B detectors do not indicate the same condition, or if all C or all D detectors, respectively, do not indicate the same condition at about the same time then relay 440, or 441 or 442 will be actuated.

For purposes of this comparison, there is provided a comparison circuit for each of the D, C and B conveyor sections indicated generally by the numerals 425, 426 and 427. Each circuit includes a pair of relays identified as 430, 440 for the D conveyor sections, 432, 441 for the C conveyor sections and 434, 442 for the B conveyor sections. Referring to circuit 425 for the D sections, relay 430 is actuated if backup detectors 22, 31 and 40 all indicate either stalled magazine piles or no stalled magazine piles at their positions. If any of lanes 1, 2 or 3 is inhibited then the detector contact for that lane is bypassed by a contact of its respective lane inhibit relay 395, 396 or 397. Relay 440 is not actuated unless relay 430 is not actuated and corresponding relay 432 and 434 for the C and B conveyor sections, respectively, are actuated. Thus, relay 440 is actuated only if the columns of magazine piles on the D conveyor sections are not even while those on the C and B sections are even. Contact 430 is a slow release contact allowing for some time delay in making the comparisons before actuating relay 440.

If contact 22c opens indicating a backup on conveyor section D1, lane 1 feed relay 335 will remain actuated unless relay 440 is actuated as described above. Thus, relay 335 will remain actuated unless there is a backup on the D1 conveyor section and the piles on the D1, D2 and D3 conveyor sections are not even. In that case, lane 1 feed relay 335 is released and lane 1 is not fed by flow director 16 until the backup on D1 is corrected or the D2 and D3 sections also indicate backups. The same test is applied if backups are detected by detectors 21 or 20 on the B1 and C1 conveyor sections, respectively.

Operation of the feed control circuits for lanes 2 and 3 is the same as described for lane 1.

With reference to FIGS. 1, 9 and 13, if backups are detected by detectors 19, 28 and 37 so that the backups have proceeded to the point where the lane feed relays 335, 336 and 337 for the three lanes are released, then accumulator clear relay 320 will also be released. This releases flow director relay 305 and infeed conveyor and flow director run relay 316 which deenergizes motors 330 and 140.

When the downstream problem causing the backup is corrected accumulator clear relay 320 will be actuated by one or more of lane feed relays 335 to 337 and will provide a hold path for flow director relay 305. The infeed conveyor 14 and flow director 16 may then be restarted by operating reset button 450 and start button 309. This will actuate relays 305 and 310 to energize the infeed conveyor motor 330 and flow director motor 140.

In the event of some gate fault which releases gate run relay 317 then, as indicated in FIG. 12, no delivery or restrictor cycle will occur. The accumulator conveyor sections are still operative, however, since accumulator run relay 313 remains actuated. After the fault has been cleared relay 317 can be actuated by operating reset switch 451 and start switch 309. Prior to doing so, however, it may be necessary or advisable to clear a gate or gates with a manual delivery cycle.

Referring to FIG. 12, this is accomplished by placing restrictor switch 343 in the restrictor closed position which actuates relay 344 and relay 344 actuates all three restrictor closed solenoids, such as solenoid 188 for lane 1. A manual delivery cycle can then be initiated for lane 1 by pressing a manual delivery cycle switch 452. This actuates relay 402 which in turn actuates lane 1 belt clutch solenoid 401 and lane 1 gating pin clutch solenoid 410 while deenergizing brake solenoid 412. The pile at the entrance to gate G1 is thus gated onto the trimmer infeed conveyor T in the manner described above.

When the lane 1 gating pins have returned to their home position, switch 218 will open and release lane 1 delivery cycle relay 402. Restrictor switch 343 may then be returned to the automatic position. Reset button 451 (FIG. 9) may then be depressed along with accumulator start button 309 to actuate gate run relay 317. This will cause opening of the restrictors through contacts 317g. Any backup which has occurred during the gate malfunction will then be handled automatically in the manner described above.

What is claimed is:

1. Apparatus for the controlled feeding of a stream of articles from an input line to an output line comprising conveyor means for receiving articles from said input line and for conveying said articles downstream toward said output line, means for driving said conveyor means, a gate for receiving articles from said conveyor means and gating said articles onto said output line, article restrictor means between said conveyor means and said gate, means for sensing the presence of an article at the entrance to said gate, means for sensing the presence of an article at said restrictor means, means for producing a control signal in response to the presence of articles at both said gate and said restrictor means, means responsive to said control signal for initiating the gating of an article to said output line and for causing said restrictor means to prevent the passage of succeeding articles to said gate during said gating operation, said conveyor means comprising a series of conveyor sections, said conveyor driving means comprising means for driving each of said sections independently, means associated with each of said conveyor sections for sensing an accumulation of articles on the adjacent downstream conveyor section and control means responsive to said accumulation sensing means for interrupting the driving of said adjacent conveyor section, each of said conveyor sections including a plurality of driven rollers upon which said articles are conveyed, each of said rollers comprising a shaft and a roller sleeve frictonally coupled to said shaft for rotation therewith, said sleeve being uncoupled from said shaft by a load of stalled articles, and said accumulation sensing means comprising a photodetector relay mounted below one of said rollers and a reflective strip carried by said roller sleeve, said relay sensing rotation or nonrotation of said strip.

2. Apparatus for the controlled feeding of a stream of articles from an input line to an output line comprising a series of conveyor sections for receiving articles from said input line and conveying said articles downstream toward said output line, means for driving each of said conveyor sections independently of the remaining sections, a gate for receiving articles from the end conveyor section of said series and for gating said articles to said output line, means associated with each of said conveyor sections for sensing a predetermined accumulation of articles on the adjacent downstream conveyor section, control means responsive to said sensing means for interrupting the driving of said downstream adjacent conveyor section, said gating means including a conveyor, a first pair of movable gating pins mounted along opposite sides of said conveyor at the entrance thereof for blocking movement of an article on said conveyor, a second pair of movable gating pins mounted on opposite sides of said conveyor for movement behind said first pair of gating pins, means for moving said conveyor, means for moving said gating pins at a speed faster than said conveyor whereby said first pair of gating pins release said article and said second pair of gating pins overtake and push said article from said conveyor line onto said output line, said conveyor sections including a plurality of driven rollers upon which said articles are conveyed, each of said rollers comprising a shaft and a roller sleeve frictionally coupled to said shaft for rotation therewith, said sleeve being uncoupled from said shaft by a load of stalled articles, and said accumulation sensing means comprising a photodetector relay mounted below one of said rollers and a reflective strip carried by said roller sleeve, said photodetector sensing rotation or nonrotation of said strip.

3. Apparatus for controlled feeding of a stream of articles from an input line to an output line comprising a flow director for receiving articles from said input line and directing said articles into a plurality of generally parallel streams of articles, a plurality of conveyors for receiving and conveying said articles in generally parallel streams downstream toward said output line, gating means at the downstream end of said conveyors for gating the leading article of each of said streams onto said output line, sensing means associated with each of said conveyors for sensing an accumulation of articles on said conveyors in excess of a predetermined allowable accumulation, means for comparing the accumulation of articles on the respective conveyors and for providing a signal to said flow director when less than all of said conveyors have an excessive accumulation of articles thereon to cause said flow director to direct articles only to conveyors not having an excessive accumulation of articles thereon, each of said plurality of conveyors including a series of independently movable conveyor sections, said sensing means for sensing an excessive accumulation of articles includes sensing means associated with each of said conveyor sections for sensing a backup of articles from the adjacent downstream conveyor section, said comparing means including means for comparing the accumulation of articles on corresponding sections of the respective conveyors, each of said conveyor sections including a plurality of driven rollers upon which said articles are conveyed, each of said rollers comprising a shaft and a roller sleeve frictionally coupled to said shaft for rotation therewith, said sleeve being uncoupled from said shaft by a load of stalled articles, and said accumulation sensing means comprises a photodetector relay mounted below one of said rollers and a relective strip carried by said roller sleeve, said photodetector sensing rotation or nonrotation of said strip.

* * * * *